March 11, 1958 B. R. GREINER 2,826,643

DEMAGNETIZATION SYSTEM

Filed Sept. 30, 1953 2 Sheets-Sheet 1

INVENTOR.
Bruce R. Greiner

BY Val R. Goshaw

ATTORNEY.

March 11, 1958 B. R. GREINER 2,826,643

DEMAGNETIZATION SYSTEM

Filed Sept. 30, 1953 2 Sheets-Sheet 2

INVENTOR.
Bruce R. Greiner

BY Verl R. Goshaw

ATTORNEY.

United States Patent Office 2,826,643

Patented Mar. 11, 1958

2,826,643

DEMAGNETIZATION SYSTEM

Bruce R. Greiner, Sherman Oaks, Calif., assignor to Radio Corporation of America, a corporation of Delaware Application September 30, 1953, Serial No. 383,192

14 Claims. (Cl. 179—100.2)

This invention relates to magnetic sound apparatus, and particularly to a bulk erasing system for magnetic film or tape.

It is well-known that magnetic film or tape is now extensively used for recording various types of signals, such as audio sound signals for phonograph or motion picture purposes. Magnetic film and tape are widely used in the production of motion pictures for the original recording of the sound accompanying the various picture sequences. After the signals on the film have been copied or rerecorded to other magnetic film or photographic film, the original film roll is subjected to demagnetization so that it may be used over again.

The present invention is an automatic method of and system for completely and uniformly erasing or removing any recorded or impressed signal from magnetic film and tape of different widths. If, for some reason, the erasing cycle is interrupted, a positive warning is provided. The system functions so as not to introduce any spurious signals during the erasing cycle.

The principal object of the invention, therefore, is to facilitate the erasing of magnetic signals or other magnetizations on a magnetic film or tape.

Another object of the invention is to provide an improved bulk film or tape erasing system.

A further object of the invention is to provide an automatic bulk magnetic film or tape erasing system whereby a positive warning is given if the predetermined erasing cycle has been interrupted, the erasing cycle being such that no spurious signals are introduced.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
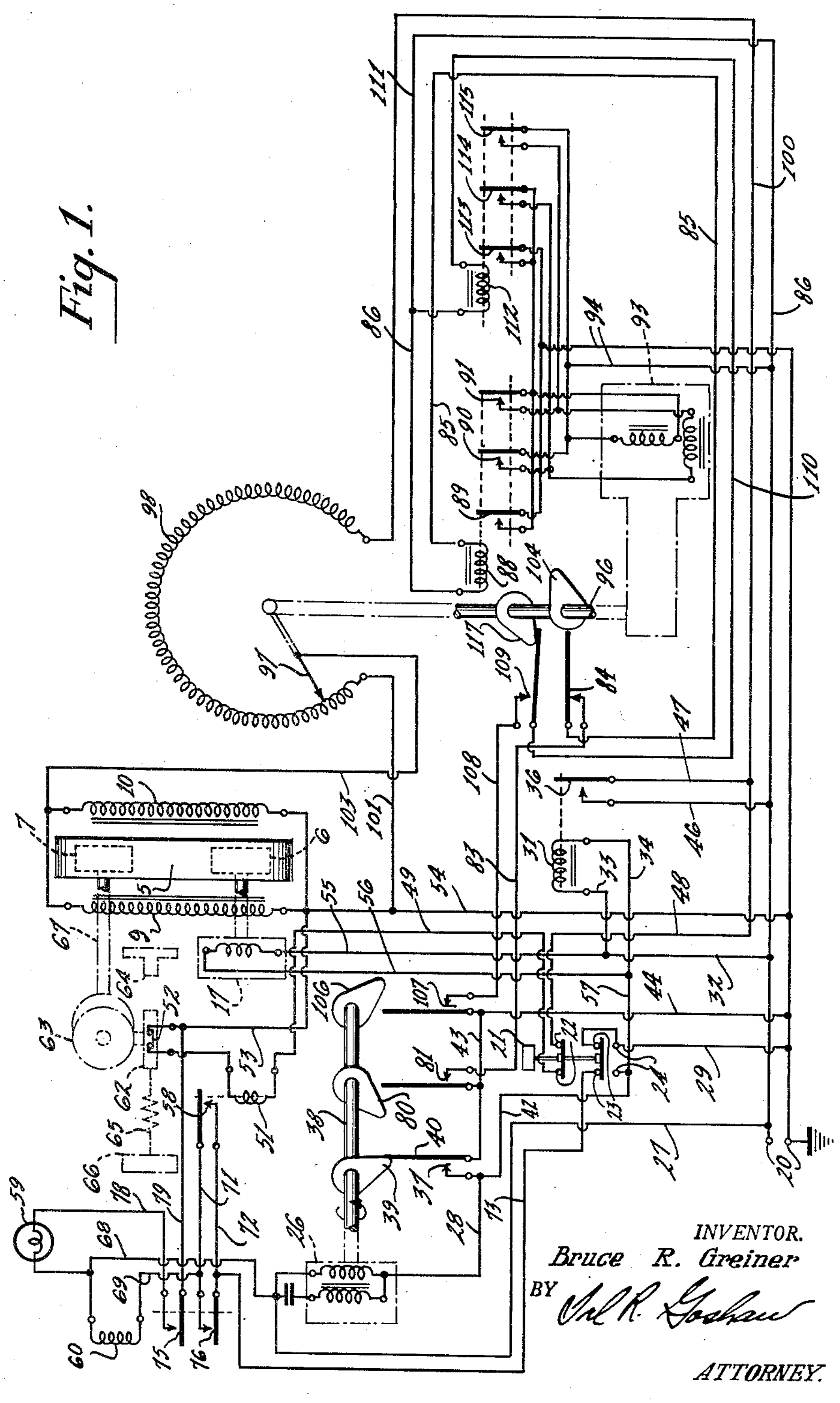
Fig. 1 is a combination diagrammatic and schematic view of a system embodying the invention.

Referring now to the drawings, a film roll 5 is supported on two rollers 6 and 7 between two demagnetization coils 9 and 10 connected in parallel. Since the film roll 5 may be magnetic film or tape of different widths, provision has been made for moving coil 10 laterally or transversely toward coil 9. This is accomplished by a threaded rod 12 having its enlarged end 13 rotatable in the mounting of coil 10, the rod being threaded through a fixed post 14 and rotatable by a hand wheel 15. Thus, the coil 10 may be moved toward and away from the coil 9. A motor 17, through a shaft 18, rotates the roller 6 which will rotate the magnetic film roll 5 on roller 6 and idler roller 7 between the coils 9 and 10.

Figures 2, 3, 4:
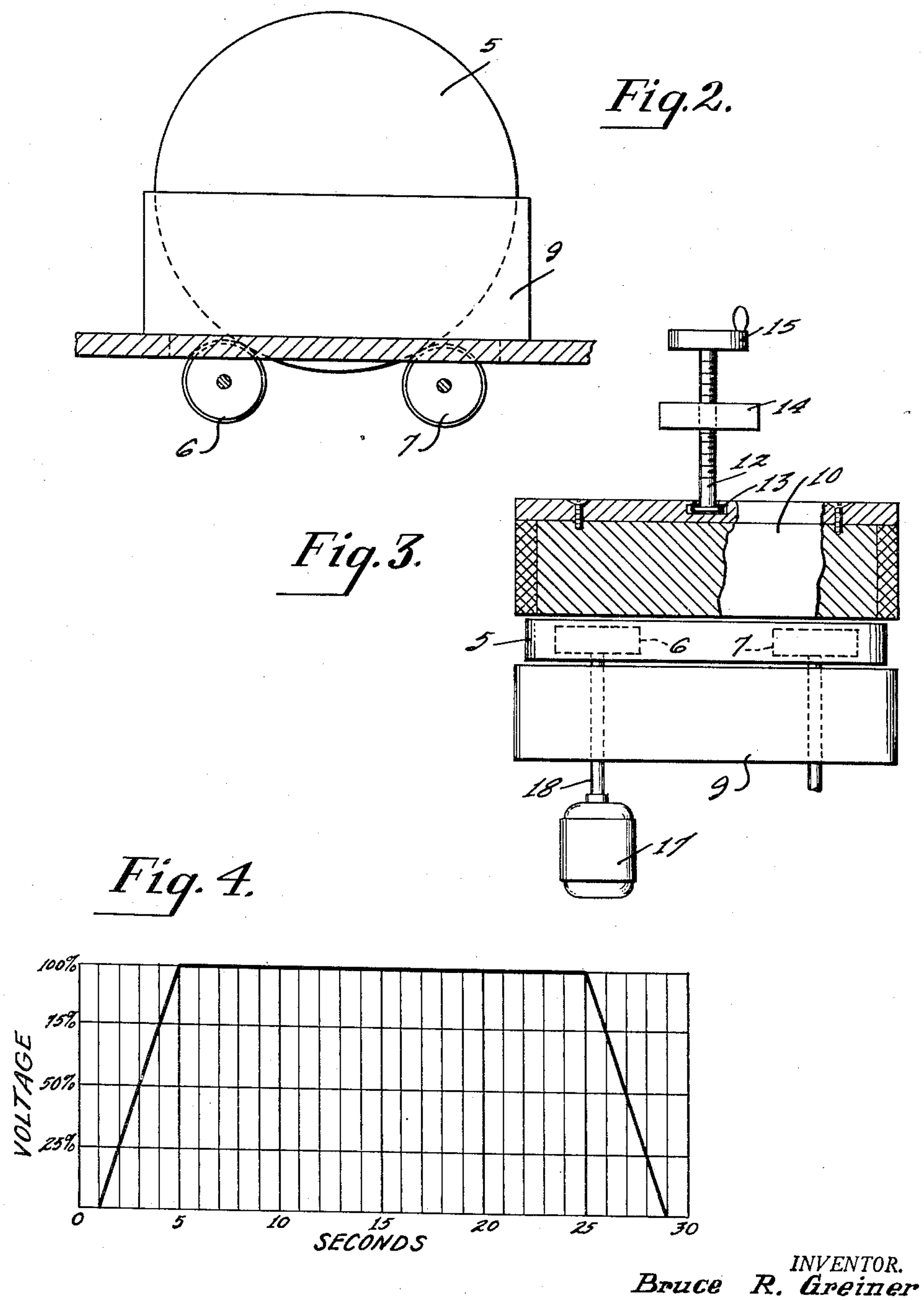
Fig. 2 is an end view of the erasing coils and film roll being erased.
Fig. 3 is a plan view of the erasing coils and magnetic film roll being erased.
Fig. 4 is a graph showing the timing cycle involved in the erasing operation of the invention.

The cycle of voltage impression on the coils is illustrated in Fig. 4. The cycle begins at zero voltage, and no voltage is applied to coils 9 and 10 during the acceleration of motor 17, which takes approximately one second. The voltage is then applied to coils 9 and 10 and increased linearly over a period of substantially four seconds to a one hundred percent value, where it is held for a period of twenty seconds. The voltage is then reduced to zero during a period of four seconds, and it takes approximately one second for the motor 17 and roll 5 to come to rest. In the present system, the voltage impressed on the coils 9 and 10 is in neighborhood of 135 volts during the twenty-second period of demagnetization.

Referring now to Fig. 1, the operation of the system will be explained. Normal alternating current power is applied to terminals 20 and all elements are de-energized until a momentary switch 21 is pressed. The pressing of switch 21 opens contacts 22 and contacts 23 and closes contacts 24. The closing of contacts 24 places power on a timing motor 26 over conductor 27, conductor 28, closed contacts 24, and conductor 29. A relay 31 is also energized by the switch 21 over a circuit including conductor 32, conductor 33, conductor 34, conductor 57, closed contacts 24, and conductor 29. Energization of relay 31 closes its contacts 36. Upon the closing of the contacts 24, power is also placed on the roll rotating motor 17 over conductor 32, conductor 55, conductor 56, conductor 57, closed contacts 24, and conductor 29.

At the beginning of any cycle with the switch 21 in the position shown in the drawing, contacts 37 are open. However, when motor 26 rotates its shaft 38 through a small angle, cam 39, which was holding contacts 37 open, releases the swinger 40 and allows the contacts 37 to close. After contacts 37 are closed, the switch 21 may be released, since the contacts 37 are in parallel with contacts 24 over a circuit including conductor 32, conductor 33, conductor 34, conductor 42, contacts 37, conductor 43, and conductor 44. Thus, the motor 26, the relay 31, and motor 17 will remain energized after the switch 21 is released and contacts 24 are opened.

When the switch 21 is released, contacts 22 are closed, which will complete a circuit to relay 51 over conductor 46, closed contacts 36, conductor 47, conductor 48, closed contacts 22, conductor 49, relay 51, switch contacts 52, conductor 53, and conductor 54. However, the relay 51 is not energized over this circuit because the contacts 52 are open. They are opened by the rotation of roller 63 on shaft 67 of roller 7, which moves one of the switch contacts to the right against stop 64 and the tension of spring 65 anchored at 66. Since motor 17 is energized upon the first actuation of switch 21, which will rotate roller 63, contacts 52 are broken before contacts 22 are made. Thus, the contacts 58 of relay 51 will remain open.

Now, should the roller 63 stop for any reason during the demagnetization operation, due to momentary nonrotation of the magnetic roll 5, the contacts 52 will close, energizing relay 51 and closing its contacts 58. The closing of contacts 58 will energize relay 60 over a circuit including conductor 27, conductor 68, conductor 69, conductor 71, closed contacts 58, conductor 72, conductor 73, closed contacts 23, and conductor 29. The energization of coil 60 will close its contacts 75 and 76. The closing of contact 75 will energize lamp 59 over conductors 27, 68, 78, closed contacts 75, conductor 79, conductor 53, and conductor 54.

Thus, if there is any stoppage of the roll 5 during the cycle of demagnetization, the lamp 59 will be energized, and, what is important, will remain energized even after the roll has again been rotated and the contacts 52 broken. This is accomplished by the holding contacts 76 which maintain relay 60 energized over conductors 27, conductor 68, conductor 69, closed contacts 76, conductor 73, closed contacts 23, and conductor 29. So, if there has been any interruption whatsoever in the rotation of the roll 5 which would introduce spurious signals, the operator will be apprised of that condition at the end of the demagnetization cycle.

Now, there will be described the automatic operation of the system which provides the demagnetizing cycle as shown in Fig. 4. Timing motor 26 rotates its shaft 38 and a cam 80 to close contacts 81, which, over conductor 44, conductor 43, closed contacts 81, conductor 83, closed contacts 84, conductor 85, and conductor 86 will energize a relay 88, which closes its contacts 89, 90, and 91 to energize a motor 93 over conductors 94. The motor 93 rotates its shaft 96, which will rotate an arm 97 of an autotransformer having a primary winding 98 to increase the voltage on the coils 9 and 10 from zero to a one hundred percent value in four seconds. (See Fig. 4.) The primary 98 is energized upon the closing of the contacts 36 over a circuit including conductor 46, closed contacts 36, conductor 47, conductor 100, primary 98, conductor 101, and conductor 54. However, over conductor 103, the coils 9 and 10 have their voltage varied thereon as the arm 97 travels over the winding 98. At the end of four seconds, the cam 104 on the shaft 96 will open contacts 84 to stop motor 93. During the next time period of approximately twenty seconds, the timing motor 26 and magnetic roll motor 17 continue to rotate while the motor 93 is stopped, which applies a one hundred percent demagntization value to the coils 9 and 10 for twenty seconds.

At the end of twenty seconds, which is the period used in the present instance, the cam 106 on shaft 38 closes contacts 107, and, over conductor 44, closed contacts 107, conductor 108, closed contacts 109, conductor 110, and conductor 111, a relay 112 is energized. The energization of relay 112 will close its contacts 113, 114, and 115, which will reverse the impression of power from conductors 94 on the motor 93. The shaft 96 will, therefore, be rotated in the opposite direction, and the arm 97 will be reversely rotated to reduce the voltage on the coils 9 and 10 to zero in approximately four seconds. At the end of the four seconds, the cam 117 on shaft 96 will break contacts 109, removing the power from the relay 112, which will stop motor 93.

The cam 39 now opens contacts 37, removing power from the timing motor 26, the roll rotating motor 17, and the relay 31, the roll 5 coming to rest in approximately one second. The contacts 52 will then be closed, but their closing will not energize relay 51 because contacts 36 are broken. However, if contacts 58 had been closed at any time during the operating cycle, the lamp 59 will be lighted to indicate the temporary stoppage of the roll 5 during the demagnetization cycle. The cams 80 and 106 controlling the energizing relays 88 and 112, respectively, for motor 93, will also stop the motor 93, cams 104 and 117 being used as a safety feature.

The above system, therefore, will take a roll of magnetic film of any width and demagnetize it automatically after the momentary switch 21 has been actuated, any departure from perfect demagnetization being indicated by a warning at the end of the cycle.

I claim:

1. A magnetic film demagnetization system comprising a pair of demagnetization coils, means for rotating a magnetic roll of film to be demagnetized between said coils, transformer means for varying the voltage on said coils during rotation of said roll of film, a first motor, a plurality of switches driven and controlled by the rotation of said motor, a second motor for actuating said transformer means to vary the output voltage therefrom, means for closing one of said plurality of switches by said first motor to start said second motor for increasting the voltage on said coils over a predetermined period, and means for closing another of said plurality of switches by said first motor to reverse said second motor for decreasing the voltage on said coils over another predetermined period.

2. A magnetic film demagnetization system in accordance with claim 1, in which another plurality of switches is provided, said switches being adapted to be opened by said second motor, and means connected to said switches for de-energizing said second motor after predetermined time periods.

3. A magnetic film demagnetization system comprising a pair of parallel arranged demagnetization coils, a pair of rollers positioned between said coils for supporting a roll of magnetic film to be demagnetized, a motor, means connecting one of said rollers to said motor for rotating said roller and said roll of film between said coils, a source of energy for said motor and said coils, a variable transformer positioned between said energy source and said coils, a second motor for actuating said transformer to vary the voltage on said coils, and a third motor for determining the periods of voltage increase, decrease, and uniform application on said coils.

4. A magnetic film demagnetization system in accordance with claim 3, in which an alarm circuit is provided for indicating stoppage of said roll of film being demagnetized, said alarm circuit including a switch, means driven by one of said rollers for maintaining said switch in open position, a relay energized by the closure of said switch, and a second relay energized by the energization of said first relay for energizing and maintaining energized said alarm circuit.

5. A magnetic film demagnetization system in accordance with claim 3, in which said second mentioned motor includes a shaft having a pair of cams thereon, and contact means opened by said cams at the end of periods of increase and decrease in voltage impressed on said transformer.

6. A magnetic film demagnetization system in accordance with claim 3, in which said third motor has a shaft having cams thereon, and a plurality of contacts adapted to be closed by said cams for energizing said second mentioned motor at predetermined times.

7. A system for automatically subjecting a roll of sound record magnetic film to a demagnetization cycle comprising means for generating two parallel alternating current demagnetization fields, means for rotating a roll of sound record magnetic film between said two demagnetization fields, means for increasing said fields from zero to a one hundred percent value over a certain period of time, means for applying the full value of said fields to said roll for a period of approximately five times that of said period of increasing fields, and means for decreasing said fields to zero over a period of time approximating that of said first mentioned period of time.

8. A system in accordance with claim 7, in which means are provided for indicating any momentary discontinuance of said rotation of said roll during the demagnetization cycle.

9. A system in accordance with claim 7, in which means are provided for impressing said demagnetization fields with a voltage of substantially 135 volts over a period of approximately twenty seconds.

10. A system for demagnetizing a roll of sound record magnetic film in a predetermined cycle comprising means for creating a demagnetization field on each side of a magnetic roll of sound record film, means for rotating said roll of film between said fields, means for increasing said field to a predetermined value in a predetermined time period, means for maintaining said field at said value for a predetermined time period, means for decreasing said field to zero during another predetermined time period, an indicator, means for energizing said indicator to indicate any momentary stoppage of said roll of film during the demagnetization cycle and means for maintaining said indicator energized after said roll of film is again rotated by said rotating means during the demagnetization cycle.

11. A system for demagnetizing a roll of magnetic film in a predetermined cycle comprising means for creating a demagnetization field on each side of a magnetic roll of film, means for rotating said roll of film, means for increasing said field to a predetermined value in a predetermined time period, means for maintaining said field at said value for a predetermined time period, means for decreasing said field to zero during another predetermined time period, means for indicating any momentary stoppage of said roll of film during the demagnetization cycle, said first mentioned means being a pair of parallel arranged coils and said second mentioned means being a pair of rollers for supporting said roll of film with its axis horizontal, and a motor connected to one of said rollers.

12. A system for demagnetizing a roll of magnetic film in a predetermined cycle comprising means for creating a demagnetization field on each side of a magnetic roll of film, means for rotating said roll of film, means for increasing said field to a predetermined value in a predetermined time period, means for maintaining said field at said value for a predetermined time period, means for decreasing said field to zero during another predetermined time period, means for indicating any momentary stoppage of said roll of film during the demagnetization cycle, said field increasing means being a variable transformer, and a motor for varying the output voltage impressed on said field creating means in a predetermined cycle.

13. A system for demagnetizing a roll of magnetic film in a predetermined cycle comprising means for creating a demagnetization field on each side of a magnetic roll of film, means for rotating said roll of film, means for increasing said field to a predetermined value in a predetermined time period, means for maintaining said field at said value for a predetermined time period, means for decreasing said field to zero during another predetermined time period, means for indicating any momentary stoppage of said roll of film during the demagnetization cycle, said last mentioned means being a signal lamp, a switch having its contacts held open by rotation of said roll of film, and a relay energized by the closure of said contacts, and means actuated by said relay for energizing said lamp and maintaining said lamp energized after said switch contacts are closed.

14. A system for demagnetizing a roll of magnetic film in a predetermined cycle comprising means for creating a demagnetization field on each side of a magnetic roll of film, means for rotating said roll of film, means for increasing said field to a predetermined value in a predetermined time period, means for maintaining said field at said value for a predetermined time period, means for decreasing said field to zero during another predetermined time period, means for indicating any momentary stoppage of said roll of film during the demagnetization cycle, said first mentioned means being a pair of parallel arranged coils and said second mentioned means being a pair of rollers for supporting said roll of film with its axis horizontal, a motor connected to one of said rollers, said field increasing means being a variable transformer, a motor for varying the output voltage impressed on said field creating means in a predetermined cycle, said last mentioned means being a signal lamp, a switch having its contacts held open by rotation of said roll of film, a relay energized by the closure of said contacts, and means actuated by said relay for energizing said lamp and maintaining said lamp energized after said switch contacts are closed.

References Cited in the file of this patent

UNITED STATES PATENTS 2,481,392 Camras ---------------- Sept. 6, 1949